United States Patent [19]

Glover

[11] 4,113,366

[45] Sep. 12, 1978

[54] FILM PROJECTION SYSTEM

[76] Inventor: Ernest Glover, 309 E. 91st St., Brooklyn, N.Y. 11212

[21] Appl. No.: 755,132

[22] Filed: Dec. 29, 1976

[51] Int. Cl.² .................. G03B 31/00; G03B 21/04
[52] U.S. Cl. .................................. 352/8; 352/104; 352/123
[58] Field of Search ............... 352/6, 8, 104, 123, 352/126, 128

[56] References Cited

U.S. PATENT DOCUMENTS

| | | | |
|---|---|---|---|
| 3,139,788 | 7/1964 | Hughes et al. | 352/123 |
| 3,383,156 | 5/1968 | Fried et al. | 352/123 |
| 3,508,818 | 4/1970 | Fried et al. | 352/123 |
| 3,733,119 | 5/1973 | Catalano et al. | 352/128 |

*Primary Examiner*—Russell E. Adams

*Attorney, Agent, or Firm*—Bertram Frank

[57] ABSTRACT

A film projection system includes a collection of cartridges each containing a film program. The cartridges are stored in a storage magazine. A selector system permits a particular film program, which may be identified by a code, to be chosen and displaces the storage magazine so that the cartridge containing the selected film program is positioned at a transfer point in which it is adjacent a transfer mechanism. A transfer mechanism is adapted to remove the cartridge from the storage magazine and position the cartridge in a film reproduction unit. Upon positioning of the cartridge within the film reproduction unit, the film will be displaced within the cartridge and will be reproduced by the unit. Upon completion of the film program, the transfer mechanism removes the cartridge from the film reproduction unit and returns the cartridge to the storage magazine.

8 Claims, 18 Drawing Figures

FILM PROJECTION SYSTEM

BACKGROUND OF THE INVENTION

1. Field of the Invention

The present invention relates to a film projection system and more particularly to a film projection system wherein in response to the actuation of a selector system, a cartridge containing a film program is automatically transferred from a storage magazine to a film reproduction unit in which the film program is reproduced, the cartridge being returned to the storage magazine upon completion of the film program.

2. The Prior Art

There are many types of film projector systems in the prior art. In one such system, a storage reel containing a film program must be manually placed on the projector and the film manually positioned or threaded through the projector to permit reproduction of the program retained on the film. More recently, projector systems have been developed in which, after the storage reel is placed in the projector, an end of the film is inserted into an automatic threading device and the projector will be threaded automatically. In all of these prior art projection systems the storage reel containing the film has to be positioned on the projector by hand. In addition, the film must either be threaded through the projector by hand or one end of the film must be inserted by hand into an automatic threading device in the projector. In either case, the presence of an individual to assist in the operation of the projector is required which severely limits the use of the projection system, especially in the field of entertainment.

Sound systems have been developed such as the well-known record player or "Jukebox" which permit individuals to select a sound recording from a collection of recordings, and the sound recording then played automatically. While such sound systems have enjoyed tremendous popularity, no such system has been developed applying similar principles to reproduce film programs in which the individual would not only hear the sound recording but would also see a visual presentation of the artist performing. Such a system would open vast areas to pre-programed film performances which have heretofore been out of reach because of the inability to select and play automatically, a pre-recorded film. Presently, individuals viewing film programs in association with sound recordings must rely on the person in control of or who operates the projection system to select or choose the film to be reproduced.

It is toward the elimination of these and other problems that the present invention is directed.

SUMMARY OF THE INVENTION

Purposes of the Invention

It is an object of the present invention to provide a film projection system which will permit an individual to select a film program contained in a cartridge from a collection of film programs contained in their own cartridges which are stored in a magazine, and which will automatically position the cartridge containing the selected film program in a film reproduction unit, reproduce the film and return the cartridge to the magazine.

Another object of the present invention is to provide a transfer mechanism for a film projection system which will remove the cartridge containing a selected film program from a magazine on which it is stored, position the cartridge in the film reproduction unit and return the cartridge to a position in the magazine when the film program is completed.

Yet another object of the present invention is to provide a film projection system wherein the need to thread the film program through the film reproduction unit once the cartridge is positioned therein is eliminated.

A still further object of the present invention is to provide a cartridge for containing a film program which eliminates the need to rewind the film in the cartridge upon completion of the program.

A still further object of the present invention is to provide a film projection system which will permit an individual or individuals to select several film programs in rapid succession and which will reproduce each film program in the order it was selected.

Still other objects of the present invention in part will be obvious and in part will become apparent as the description proceeds.

BRIEF DESCRIPTION OF THE INVENTION

Generally, the foregoing and other objects of the invention are achieved by a film projection system which includes a collection of cartridges each containing a film program which is stored in a storage magazine. A selector system permits a cartridge to be chosen and positions the cartridge adjacent a transfer mechanism which is adapted to remove the cartridge from the storage magazine and position it within a film reproduction unit. When the cartridge is positioned within the film reproduction unit, the film is reproduced. Upon completion of the film program, the transfer mechanism returns the cartridge to the storage magazine.

Each cartridge has a turntable and a spindle therein on which an endless loop of movie film which contains the film program is stored. Guide rollers and pressure pads within the cartridge control the movement of the film loop within the cartridge.

The storage magazine is formed as an endless belt of hingedly-connected elements each of which are provided with holding means adapted to detachably support one of the cartridges.

A selector system includes a series of actuatable selecting buttons each of which is associated with a switch. Each of the filmed programs may be identified by a code which corresponds to the actuating of a particular set of selecting buttons. When a set of selecting buttons is actuated, the associated switches are closed and an input signal is conveyed to a memory and comparator circuit. The memory and comparator circuit compares the input signal just received with the last received input signal and generates an output signal which is conveyed to a storage magazine drive motor. The storage magazine drive motor is operatively coupled to one of a pair of pulleys which support the storage magazine. The output signal from the memory and comparator causes the storage magazine drive motor to position the cartridge containing the selected film program at a transfer point where it will be adjacent the transfer mechanism.

The transfer mechanism is adapted to releasably engage the cartridge positioned at the transfer point and convey it to the film reproduction unit. The mechanism includes a set of telescopic arms positioned on a carriage which is movable on a base. Attached to a first arm is a pair of clamp members adapted to engage the cartridge. The clamp members are slidably attached to a transverse leg upon which the first arm is permitted slideable movement. A transfer mechanism drive motor which is energized by the selector system urges the first arm inwardly on the second arm causing the clamp members to slide within the transverse arm to thereby engage the cartridge. As the drive motor continues to urge the first arm inwardly, the movement of the clamp members is opposed by the cartridge and the force exerted on the first arm by the transfer mechanism drive motor is conveyed through stop means to the second arm which is thereby urged inwardly on the carriage until it causes an interruption in the energization of the transfer mechanism drive motor. Simultaneously, a solenoid having a shaft connected to the carriage is energized, resulting in the carriage being displaced on the base. Such displacement on the base brings the cartridge into position within the film reproduction unit.

The film reproduction unit is provided with the necessary projection, sound track pickup and amplification, and film drive systems. The cartridge is provided with apertures therein which, when the cartridge is positioned in the film reproduction unit, place the film in operable communication with the projection and sound track pickup and amplification systems. In addition, the film drive system operatively engages the turntable within the cartridge and is energized resulting in the film travelling through the cartridge and thus through the film reproduction system.

Cuing means on the film at the end of the film program interrupts the film drive system to stop movement of the film within the cartridge and causes de-energization of the solenoid to thereby remove the cartridge from the film reproduction system. The cuing means also causes, after a time delay, the re-energization of the transfer mechanism drive motor to return the cartridge to the storage magazine.

The invention consists in the features of construction and arrangement of parts which will be detailed hereinafter and described in the appended claims.

BRIEF DESCRIPTION OF THE DRAWINGS

For a better understanding of the present invention, reference should be had to the accompanying drawings wherein like numerals of reference indicate similar parts throughout the several views and wherein.

DESCRIPTION OF THE PREFERRED EMBODIMENT

Figure 1:
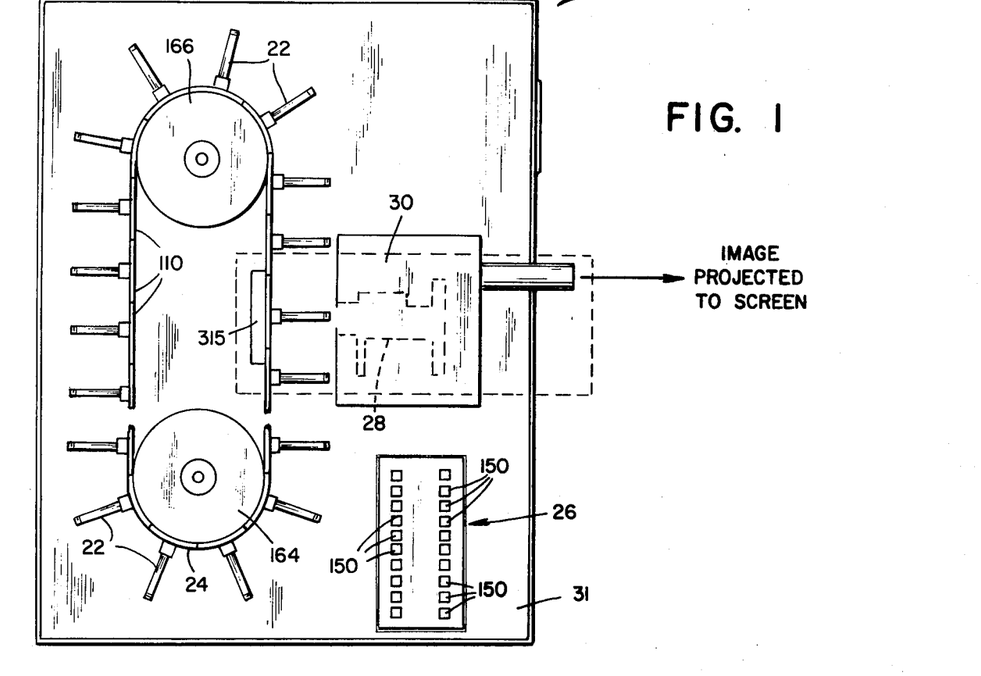
FIG. 1 is a top view of a film projection system in accordance with the present invention.

A film projection system in accordance with the present invention is shown in FIG. 1 and is identified generally by the reference numeral 20. The film projection system 20 includes a collection of cartridges 22, each containing a film program, a storage magazine 24, a selection system 26, a transfer mechanism 28 and a film reproduction unit 30 all of which will be described hereinafter in detail. All of the various components may be positioned on a base 31.

The present invention may be understood more readily with a brief introductory explanation of the major components included in the invention.

As used herein, the term film program defines an endless loop of movie film bearing audio signals in the form of a sound track and visual signals in the form of transparencies. The audio and visual signals are placed on the film so that when the film is reproduced as described below, the audio and visual signals will be synchronized to present a coherent program.

Each cartridge in the collection of cartridges 22 has a turntable with a spindle therein on which the endless loop of movie film is stored. Guide rollers and pressure pads control the movement of the film within the cartridge. The cartridge is provided with apertures therein so that the film may be exposed to a projection system and a soundtrack pickup system in the film reproduction unit when the cartridge is positioned in the film reproduction unit.

The storage magazine 24 is adapted to hold each of the cartridges when they are not in the film reproduction unit. Each cartridge may occupy a particular position on the storage magazine. The film program contained within each cartridge may be identified by a code, i.e. a two digit number or a letter and a number.

The selector system 26 includes a series of actuatable selecting buttons which correspond to the possible combination in the code identifying the film programs. The selector buttons are attached to switches, and when a particular number of selecting buttons are actuated in a particular sequence, an input signal is generated. This input signal is fed to a memory and comparator circuit which compares the input signal to the last input signal received and which generates an output signal to a magazine drive system. The magazine drive system displaces the storage magazine so that the cartridge containing the film program corresponding to the input signal is positioned at a transfer point adjacent the transfer mechanism.

When the cartridge containing the selected film program is positioned at the transfer point, the transfer mechanism automatically removes the cartridge from the storage magazine and accurately positions it within the film reproduction unit, which is similar to a conventional film projector and is provided with a projection system, a sound track pick-up and amplification system and a film drive system. When the cartridge is positioned on the film reproduction unit, the film drive system operatively engages the turntable within the cartridge and the film is positioned within the projection system and the sound track pick up systems. The film drive system is then energized resulting in the film unwinding from the spindle on the turntable, moving through the cartridge and the film reproduction unit and winding back onto the turntable, thereby projecting a motion picture with sound accompaniment.

A cuing means on the film at the end of the film program causes the film drive system to be de-energized and the transfer mechanism energized to return the cartridge to the storage magazine.

The projection system is now in a condition to receive the next input signal and will reproduce the film program corresponding to the next input signal received in a manner identical to that just described.

Each of the above noted components and its formal relationship with its succeeding and preceding component will be described hereinafter in greater detail with appropriate reference numeral designations. This preceding description was merely for the purpose of setting forth in a very general manner the overall operation and function of the film projection system in accordance with the present invention so that the more detailed description to follow will be more readily understandable.

THE CARTRIDGE

Figure 2:
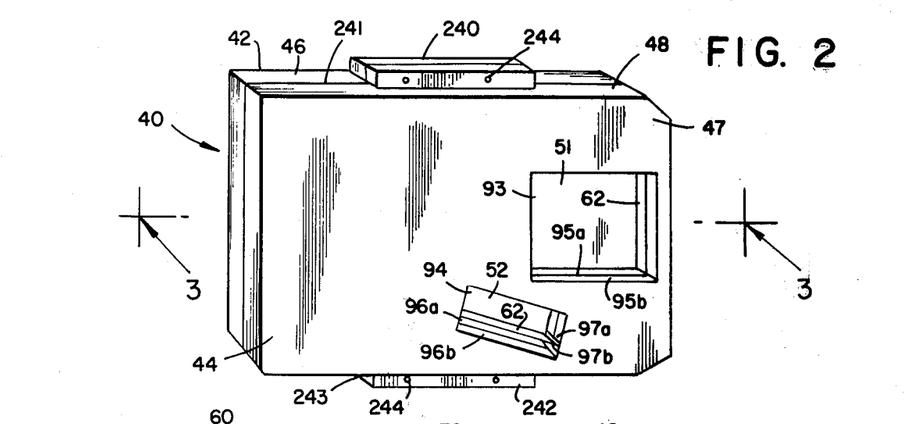
FIG. 2 is a perspective view of a cartridge containing a film program.
Figure 3:
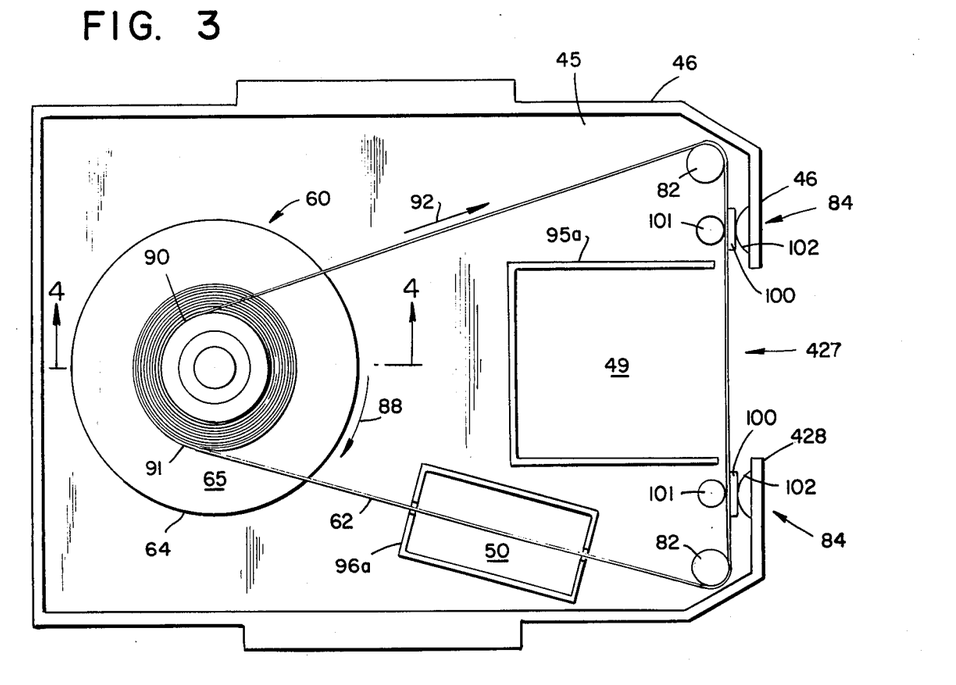
FIG. 3 is an enlarged view taken substantially along the line 3—3 of FIG. 2.

The film cartridge in accordance with the present invention is best seen in FIGS. 2 and 3 and is identified by the reference numeral 40. The cartridge 40 may be formed from rigid, light weight moldable material such as plastic. It is to be understood that while only one cartridge will be described in detail hereinafter, all of the cartridges included in the present invention are of an identical construction. It will be appreciated by those skilled in the art after perusing the description below, that the cartridge 40 closely resembles a type of cartridge currently being utilized to store an endless loop of magnetic recording tape.

The cartridge 40 is formed from a first and a second mating housing portion 42, 44 respectively. The housing portion 42 has a side wall 45 and peripheral end walls 46. Similarly, the housing portion 44 has a side wall 47 and peripheral end walls 48. In each side wall 45 and 47 there is a pair of openings 49 and 50, and 51 and 52 respectively for reasons which will become apparent as the description proceeds. When the housing portions are joined, the openings are in registry to create apertures in the cartridge 40. The housing portions may be joined together along the edges of their peripheral end walls 46 and 48 by adhesive or by the interaction of friction pins extending from one housing portion with pin receiving apertures (not shown) on the other housing portion. Located within the cartridge 40 is a turntable 60 which is adapted to receive, store and feed an endless loop of film 62. The film 62 which may be preferably standard 8 mm film contains the film program which is to be reproduced. The film projection system in accordance with the present invention is adapted to reproduce short film programs, i.e. film programs having a duration of approximately less than 10 minutes. While the system can be used with longer running film programs the storage problems associated with such lengths of film become a problem. These longer programs when contained on 8 mm film necessitate larger cartridges and consequently, the relative sizes of the storage magazine and transfer mechanism components of the system increase proportionately. The programs contained on the film 62 may be educational in nature or may be the presentation of a musical artist or musical group performing a musical composition. In the latter case, the present invention is a viable substitute for the well known and popular "Jukebox".

Figure 4:
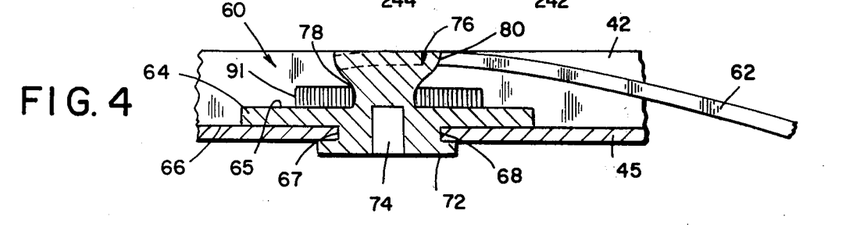
FIG. 4 is a sectional view taken substantially along the line 4—4 of FIG. 3.

As best seen in FIG. 4 the turntable 60 includes a base 64 having an upper surface 65 and a lower surface 66 from wnich depends a centrally disposed cylindrical projection 67 which is rotatably received within an opening 68 in the side wall 45 of the housing portion 42. The turntable 60 is journaled for rotational motion by the interaction of the inner surface 65 of the base 64 with the inner surface of wall 45 and an inner surface of a flange 72 at the end of the projection 67 with the outer surface of the wall 45. For reasons which will become apparent as the description proceeds, extending through the flange 72, the projection 67 and into the base 64 is a centrally disposed drive spindle aperture 74.

Projecting from the upper surface 65 of the base 64 is a centrally disposed spindle 76 having a concave external wall section 78 immediately adjacent the base 64 and a gradually outwardly flared section 80. The distance the concave section extends above the base 64 is equal approximately to the width of the film 62. This particular configuration of the spindle aids in the unwinding of the stored film as will be described below.

A system of guides and pressure pads is provided within the cartridge to define a path of travel for the film in the cartridge and to control the film as it travels along this path. Guide rollers 82 control the direction of travel of the film 62 and pressure pad assemblies 84 prevent the development of a slack condition in the film.

The turntable is designed to permit the film stored thereon to be unwound from the spindle 76, and wound onto the external diameter of the film stored on the turntable base 64.

The endless loop of film 62 is wrapped on the turntable base 60 in the direction of arrow 88, i.e. clockwise in FIG. 3, on the concave section 78 and is placed through the guide rollers and pressure pad assemblies. As the turntable rotates clockwise, i.e. the direction of arrow 88 in FIG. 3 as will be described in greater detail, the portion of film 90 immediately adjacent the concave section 78 of the spindle 76 is drawn outward along the flared end section 80 by the force exerted at the periphery of the stored film 91. The portion of film 90 is drawn through the cartridge in the direction of arrow 92 and returned to the base.

As mentioned hereabove, openings 49, 50 and 51, 52 are provided in the side walls 42 and 44 respectively. When the housing portions are joined the openings are in registry to form a first aperture 93 and a second aperture 94 in the cartridge 40. The film is directed along its path of travel within the cartridge through the apertures. When the cartridge is positioned in the reproduction unit as will hereinafter be described, the film is exposed in the apertures to the projection system and the sound track pick up system so that the audio and visual signals on the film may be reproduced.

To prevent dust or dirt from entering the cartridge 40 through the first aperture 93, walls 95a and 95b may extend along the periphery of the aperture 49 and 51 respectively. Similarly the walls 96a and 96b extend along the periphery of openings 50 and 52 respectively to seal the aperture 94. The walls 96a and 96b are provided with slits 97a and 97b, to allow the film to pass therethrough as shown in FIG. 2.

As mentioned hereinabove, pressure pad assemblies are provided within the cartridge 40 to prevent a slacking condition of the film. Each pressure pad assembly 84 includes a pad 100 of a soft material such as felt which is urged against a roller 101 by a leaf spring 102. The film passes between the pad 100 and roller 101. It will be appreciated by those skilled in the art that additional guide rollers and pressure pad assemblies may be added to the structure herein disclosed. Further, guiding and tensioning means of types other than those disclosed herein may be substituted for the structures disclosed without detracting from the present invention.

THE STORAGE MAGAZINE

Figure 5:
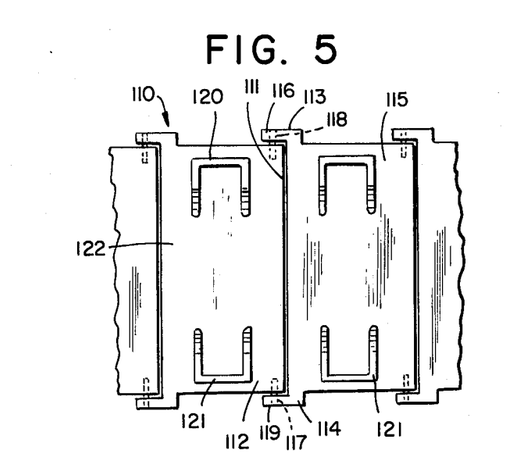
FIG. 5 is an enlarged detail view of a storage magazine constructed in accordance with the present invention.

The storage magazine 24 includes a series of identical hingedly interconnected elements 110 which form an endless belt-like structure. As best seen in FIG. 5, a side 111 of element 112 is received between extensions 113 and 114 of the immediately adjacent element 115. The extensions 113 and 114 have apertures 116 and 117 therein through which hinge pins 118 and 119 may pass. The pins 118 and 119 are securely fastened to the element 112. By hingedly connecting the elements together, a flexible belt-like structure is created.

Figure 6:
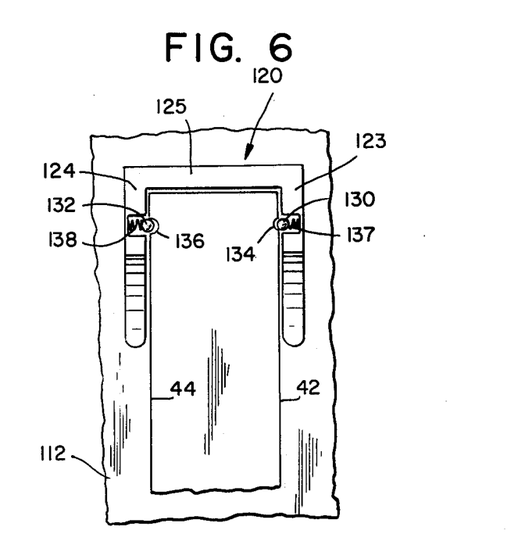
FIG. 6 is an enlarged partial sectional view of a cartridge holding means.
Figure 7:
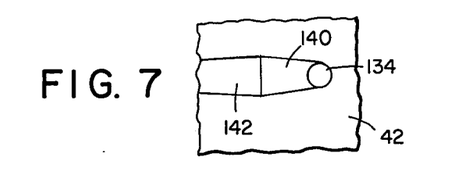
FIG. 7 is an enlarged detail view of a portion of the cartridge illustrated in FIG. 2.

Associated with each element 110 is a cartridge holding means which will detachably support one of the cartridges 40 on the element so that the cartridge 40 will not be accidently dislodged from the storage magazine 24. The cartridge holding means, however, will permit the transfer mechanism 28 hereinafter described to remove the cartridge from the storage magazine 24. One type of cartridge holding means is illustrated in FIGS. 6 and 7 as being a pair of opposed "C" shaped pockets 120 and 121 on the face 122 of the element 112. The structure of the pockets 120 and 121 are identical and for brevity only the pocket 120 and the manner in which it cooperates with the cartridge 40 will be described in detail. Pocket 120 has a pair of side walls 123 and 124 which may be joined by connecting wall 125. The distance between the inner wall surface of side walls 123 and 124 is slightly greater than the width of a cartridge 22 so that the cartridge may be slidably received therebetween. Ball detents serve to releasably secure the cartridge in the pockets. Positioned on the inner wall surface of the side wall 123 is a first spring loaded ball 130. Similarly, a second spring loaded ball 132 is positioned opposite the first spring loaded ball 130 on side wall 124. The first and second balls 130 and 132 are adapted to cooperate with dimples 134 and 136 respectively on the side walls 42 and 44 of the cartridge. The springs 137 and 138 urge the balls 130 and 132 into the dimples 134 and 136 respectively. The cooperation of the spring loaded balls 130 and 132 with the dimples 134 and 136 prevents accidental dislodgment of the cartridge 40 from the element 112.

When the transfer mechanism engages the cartridge 40, it subjects it to a force pulling it perpendicularly away from the face 122 of the element 112. The surface of side wall 42 immediately adjacent the dimple 134 is provided with a camming surface 140 (FIG. 7) to urge the ball 130 inwardly into the side wall 124 as the transfer mechanism 26 pulls the cartridge 40 from the element 112. Similarly, the side wall 44 has a camming surface to likewise urge the ball 132 inwardly into the side wall 124.

When the cartridge 40 is returned to the storage magazine 24 upon completion of the film program, the ball 130 biased outwardly by the spring 137 will be urged inwardly by a reverse camming surface 142 as the cartridge first enters the pocket 120. As the cartridge 40 is carried further into the pocket, the spring loaded ball 130 will ride on the camming surface 140 and will snap into the dimple 134. Likewise the other spring loaded balls in pockets 120 and 121 will snap into the remaining dimples on the side walls of the cartridge to support the cartridge on the element 112.

THE SELECTOR SYSTEM

The selector system 26 incorporated in the present invention is arranged to receive and store a plurality of signals each corresponding to an individual film program and to displace the storage magazine 24 so that the cartridge containing a selected film program is positioned at a transfer point from which the transfer mechanism 28 can remove the cartridge from the storage magazine and position it in the film reproduction unit 30.

It will be appreciated by those skilled in the art that such selector systems are well known. Therefore, the components of the selector system 26 of the present invention will be described only briefly hereinafter.

Figures 8, 9:
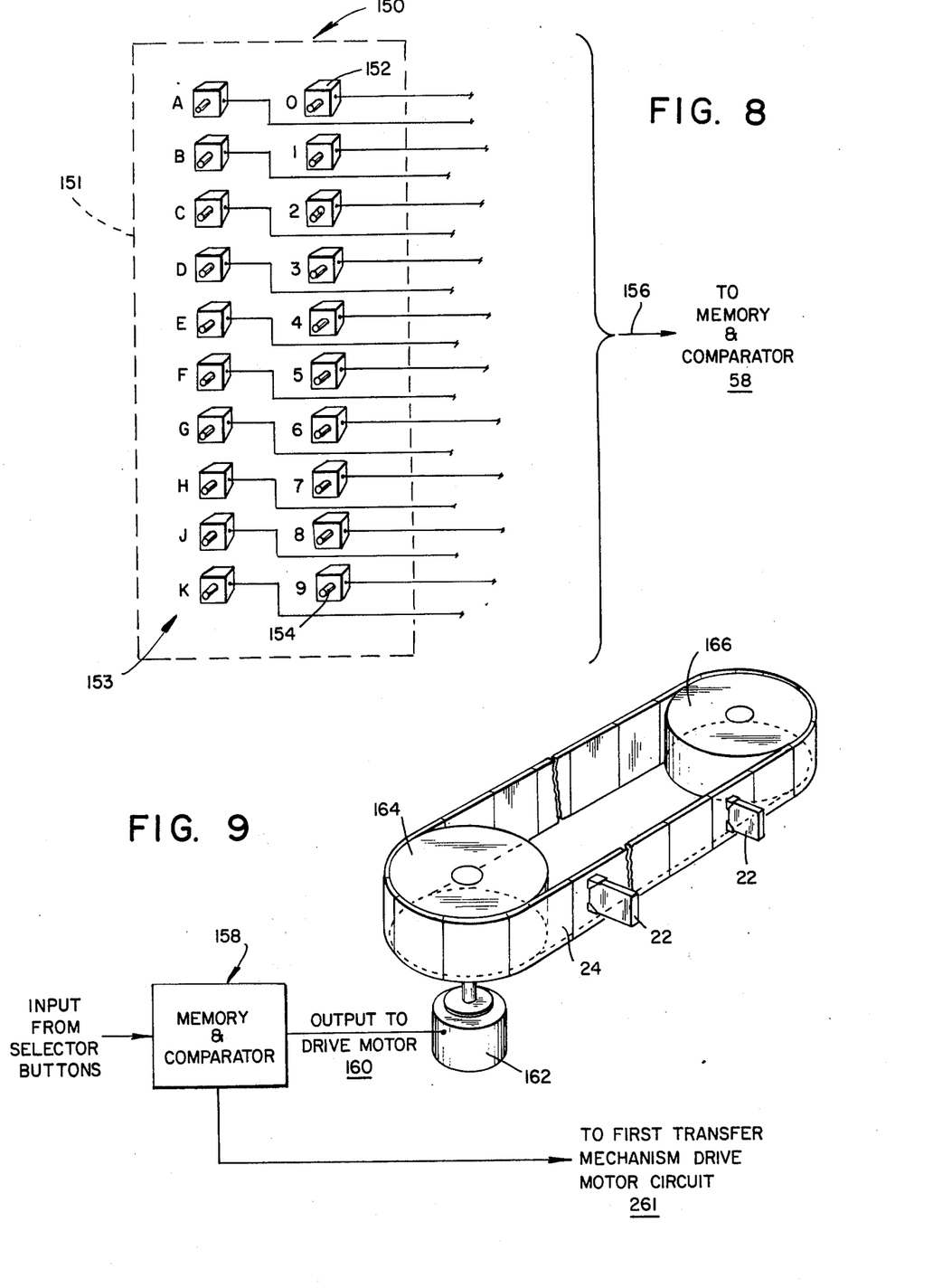
FIG. 8 is a schematic diagram of a portion of the selector system in accordance with the present invention.
FIG. 9 is a schematic diagram of the selector system in accordance with the present invention.

With reference to FIGS. 8 and 9, the selector system 26 includes a multiplicity of actuatable selector buttons 150 mounted in a housing 151. Associated with each of the multiplicity of actuatable selector buttons 150 is a switch 152. The housing may be integrally formed with the base 31 or may be separate therefrom. When the film projection system is used commercially, the selector means preferably is at a point remote from the balance of the components in the system.

The film projection system described herein is arranged to reproduce fifty film programs and for convenience the film programs are identified as A0, A1 . . . A9, B0, B1 . . . B9, C0, C1 . . . C9, . . . K0, K1 . . . K9 (the letter I is not used to avoid confusion with the number 1). Selections are made by actuating one button each of two series of 10 buttons. One series 153 of actuatable selector buttons is lettered A, B, C . . . H, J, K (FIG. 8). The other series 154 of actuatable selector buttons is numbered 0, 1, 2, . . . 7, 8, 9. Actuation of selector buttons A and 1, for example, generates an input signal 156 to a memory and comparator identified in FIG. 9 by reference numeral 158. The memory and comparator 158 will compare the input signal 156 to the last received input signal (corresponding to the immediately preceding selection) and will generate an output signal 160.

The output signal 160 is conveyed to a magazine drive motor 162 which is operably coupled to a drive pulley 164. The storage magazine 24 is suspended between the drive pulley 164 and an idler pulley 166.

The magazine drive motor 162 will be energized to displace the storage magazine 24 to position the cartridge containing the film program identified as A1 at the transfer point.

The next film program to be reproduced may be selected immediately after the selection of the film program identified by A1. For example, selector buttons C and 7 may be depressed immediately after A and 1. An input signal corresponding to C7 will be conveyed to the memory and comparator 158. When the cartridge containing the film program identified as A1 is returned to the storage magazine after the film is reproduced, the memory and comparator 158 will compare the input signal corresponding to C7 with the input signal corresponding to A1 resulting in the generation of an output signal which will energize the magazine drive motor 162. The storage magazine 22 will be displaced until the cartridge containing the film program identified as C7 is positioned at the transfer point.

Obviously, more sophisticated known selector systems may be substituted in the present invention for the selector system just described. In one such system, the storage magazine may be provided with more storage spaces than the number of cartridge being stored so that the cartridges need not be returned to a particular position in the the storage magazine, but may be returned to a space therein which is closest to the next cartridge to be transferred to thus minimize down time of the film projection system. In such a selector system, the position of a particular cartridge is retained in a memory unit which, when the film program within the cartridge is again selected, will automatically recall the position of the cartridge in the storage magazine and will generate an output signal to position the cartridge at the transfer point.

As mentioned hereinabove, the film projection system herein described may be used commerically and in such a case, the selector system is modified so as to be coin operated. Again, such selector systems are well known in the art, and for the sake of brevity, will not be described herein.

THE TRANSFER MECHANISM

Once the cartridge containing the selected film program is positioned at the transfer point by the selector system 26, the transfer mechanism 28 removes the cartridge from the storage magazine and positions it within the film reproduction unit 30.

Figure 13:
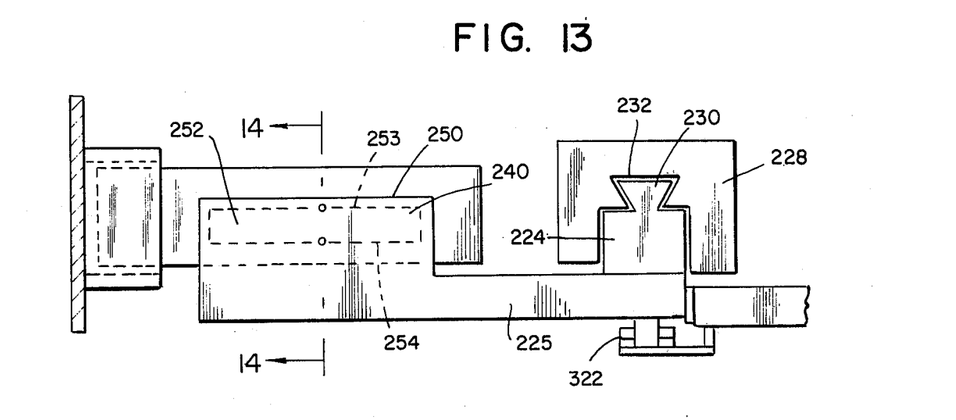
FIG. 13 is an enlarged sectional view taken substantially along the lines 13—13 of FIG. 11.
Figure 14:
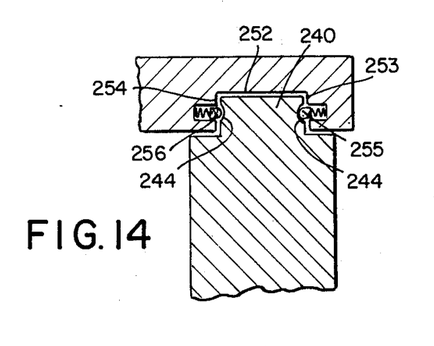
FIG. 14 is a sectional view taken substantially along the lines 14—14 of FIG. 13.

As best seen in FIGS. 10 through 13, a set of operatively connected telescoping transfer arms 200 is supported on a transfer carriage 202. The transfer carriage is slidably positioned on a carriage base 203 immediately adjacent the film reproduction unit 30. The set of telescoping transfer arms includes a first arm 204 having a flange 205 which is received in a channel 206 in a second arm 207 so that the first arm 204 is slidably retained in the second arm 207. The second arm 207 has a flange 208 which in turn is slidably retained in a channel 209 on the transfer carriage 202. The second arm 207 has a transverse arm 210 at its outward end 212, i.e. the end immediately adjacent the cartridge 40. The transverse leg 210 has an opening 214 therethrough, through which a head 216 on the first arm 204 may pass. Connected to the head 216 by means of linkages 218 and 220 are "L" shaped first and second clamp members 222 and 223 respectively. The first clamp member 222 has a vertical leg 224 and a laterally extending leg 225. Similarly, the second clamp member 223 has a vertical leg 226 and a laterally extending leg 227. The first clamp member 222 is slidably retained in the upper portion 228 of the transverse arm 210 by the interaction of a key 230 on the vertical leg 224 with a key way 232 in the upper portion 228 (FIG. 13). Likewise, the second clamp member 223 is slidably retained in the lower portion 233 of the transverse arm 210.

The cartridge 40 is provided with a first projection 240 along its top wall 241 and a second projection 242 along its bottom wall 243. Each projection has dimples 244 therein for reasons which will become apparent. The laterally extending leg 225 of the first clamping member is adapted to releasably engage the first projection 240. The laterally extending leg 225 has an offset portion 250 with a rectangular recess 252 therein which is sized slightly greater than the first projection 240. On the opposed inside walls 253 and 254 of the rectangular recess 252 are spring loaded balls 255 and 256 respectively which are adapted to cooperate with the dimples 244 on the first projection 240. Similarly, the laterally extending leg 227 of the second clamp member is adapted to releasably engage the second projection. This structure will not be described in detail since it is identical to the structure of the laterally extending leg 225.

Figure 10:
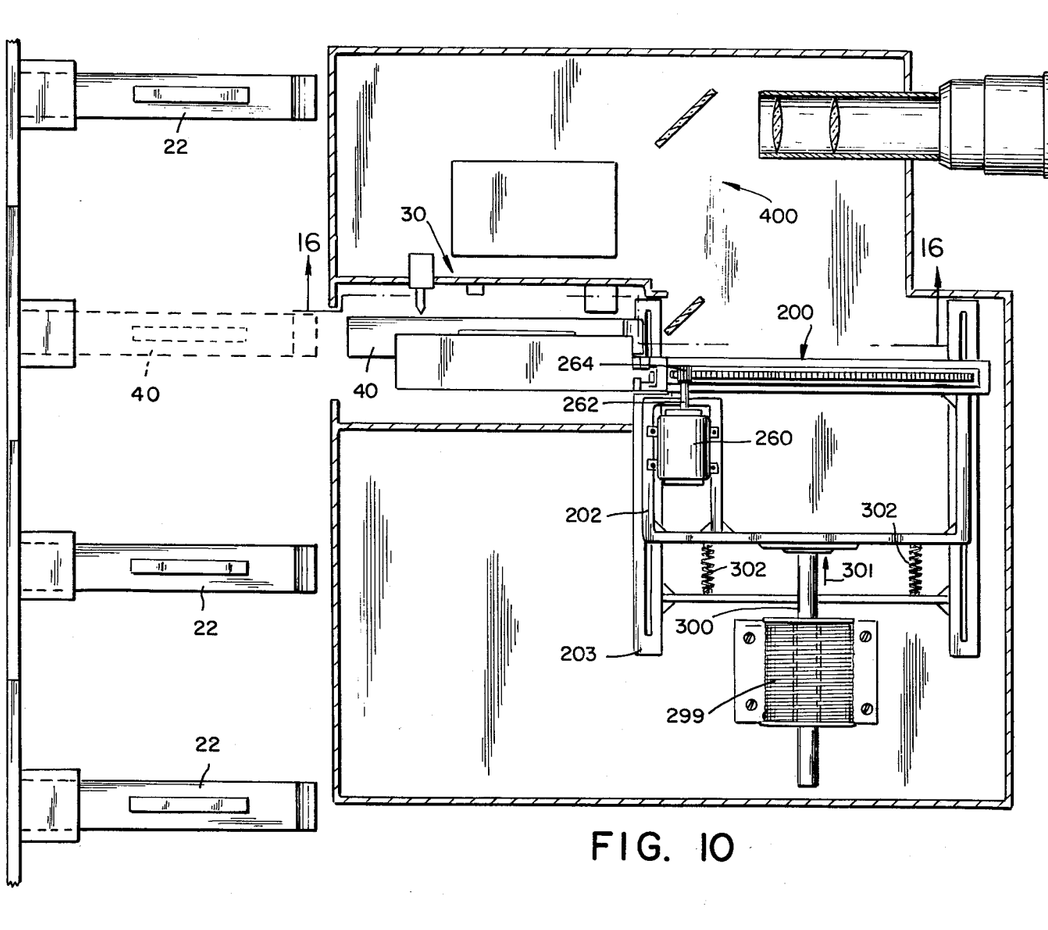
FIG. 10 is an enlarged partial sectional view of the portion of FIG. 1 contained within the dotted lines.
Figure 11:
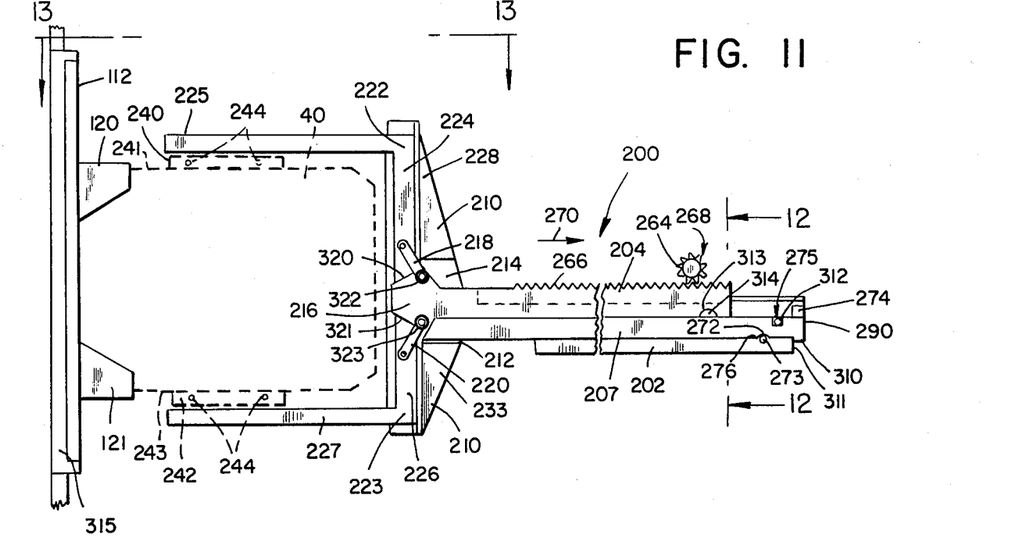
FIG. 11 is an enlarged view of a portion of the transfer mechanism in accordance with the present invention, with a cartridge detachably supported on the storage magazine.
Figure 12:
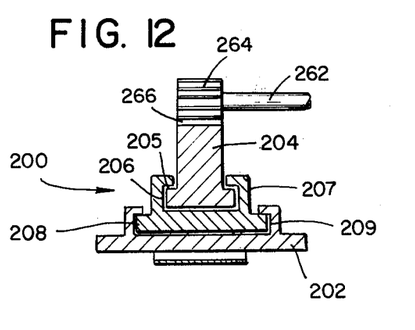
FIG. 12 is a sectional view taken substantially along the lines 12—12 of FIG. 11.

Referring now to FIGS. 10 and 11 a transfer mechanism drive motor 260 is mounted to the transfer carriage 202. The transfer mechanism drive motor 260 has a drive shaft 262 with a pinion 264 at its end. The first transfer arm 204 is provided with gear teeth 266 which operatively engage the pinion 264.

Figure 15:
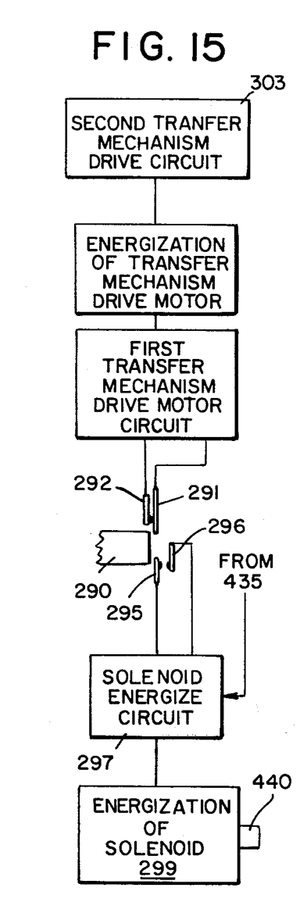
FIG. 15 is a schematic drawing of the transfer drive motor circuit and solenoid energization circuit in accordance with the present invention.

When the cartridge containing the selected film program is positioned at the transfer point shown in dotted lines (FIG. 10), the first and second projection 240 and 242 will be in registry with the recesses in the laterally extending legs 225 and 227 respectively as seen in FIG. 11. After the cartridge is so positioned, the transfer mechanism drive motor 260 is energized by the selecting means 26 through a first transfer mechanism drive motor circuit 261 rotating the drive shaft 262 and the pinion 264 in the direction of arrow 268 in FIG. 11, i.e. clockwise. As the pinion 264 rotates, the first arm 204 is displaced in the direction of arrow 270. The second arm 207 is locked in place relative to the transfer carriage 202 by an arm locking means illustrated as a spring loaded ball detent 272 including a spring loaded ball 273. As the first arm 204 is displaced inwardly, the first clamp member 222 and the second clamp member 223 are displaced toward each other on the transverse arm 210 through the linkages 218 and 220 respectively. The laterally extending legs 225 and 227 will move over the first and second projection 240 and 242 respectively which will be received within the recesses on the respective legs. The first and second clamp members 222 and 223 are drawn together with sufficient force to cause the spring loaded balls positioned in the recesses to engage the dimples 244 on the projections 240 and 242. The cartridge 40 will now oppose further movement of the first and second clamp members 222 and 223 towards each other on the transverse arm 210. Positioned on the second arm 207 is a stop 274 which will abut the first arm 202 at the instant movement of the first and second clamp members 222 and 223 is opposed by the cartridge 40. Simultaneously, another spring loaded ball detect 275 in the second arm 207 locks the first and second arms together. The force exerted by the transfer mechanism drive motor 260 on the first arm 204 is transferred through the stop 274 to the second arm 207. The spring loaded ball detect 272 does not exert enough force on the second arm 207 to oppose the force of the transfer mechanism drive motor and the ball 273 is urged out of the detent by a camming surface 276 on the arm. The second arm 207 is therefore urged inwardly on the transfer carriage 202 until its end 290 abuts a first leaf contact 291 which is part of the first transfer mechanism drive motor circuit 261 (FIG. 15). The contact 291 is urged from the first contact strip 292 which is in circuit with the first transfer mechanism drive motor circuit 261 thereby breaking the circuit 261 and de-energizing the transfer mechanism drive motor 260.

The end 290 of the second arm 207 simultaneously abuts a second leaf contact 295 and urges it into contact with a second contact strip 296 to complete a solenoid energizing circuit 297.

As the solenoid 299 is energized, the shaft 300 which is connected to the transfer carriage 202 is urged in the direction of arrow 301 resulting in the transfer carriage 202 sliding on the base 203 in the direction of arrow 301. The length of the shaft 300 is such that when the solenoid 299 is completely energized, the cartridge 40 is brought into operative engagement with the film reproduction unit 30 as will hereinafter be described.

The transfer carriage 202 is biased away from the reproduction unit 30 by coil springs 302 so that when the circuit supplying power to the solenoid 299 is interrupted by a cuing means on the film more fully described hereinbelow, the transfer carriage 202 returns to its rest position on the carriage base 203. The cuing means on the film also activates a time delay switch in a second transfer mechanism drive motor energization circuit 303. The time delay switch will remain open, after its activation, for a period of time sufficient to permit the transfer carriage 202 to return to its rest position. Another time delay switch in the first transfer mechanism drive motor circuit 261 will receive a signal from the cuing means to prevent the energization of the drive motor 260 by the circuit 261 until the cartridge 40 is returned to the storage magazine. When the time delay switch closes, the second circuit 303 energizes the transfer mechanism drive motor 260 so that its operation is reversed, thereby reversing the direction in which the drive shaft 262 and the pinion 264 rotate, i.e. a direction opposite arrow 268. The engagement of the pinion 264 with gear teeth 266 causes the second arm 207 to move outward on the transfer carriage 202 until a second stop 310 abuts a protuberance 311 on the transfer carriage. When the second arm 207 reaches this position the third spring loaded ball 273 snaps into the dimple on 207 to lock the second arm 207 on the transfer carriage 202. At the same time, the spring loaded ball 312 in another ball detent 275 is urged out of the dimple 313 on the first arm 204 by a camming surface 314 inward of the dimple 313 and the first arm 204 carries the cartridge 40 back into engagement with the pockets 120 and 121 on the element 112. Since continued outward travel of the cartridge 40 is opposed by the element 112 and a bearing plate 315 on the base 31, continued movement of the first arm 204 on the second arm 207, which is now held stationary results in the first and second clamp members 222 and 223 being urged outwardly on the transverse arm 210 by the camming surface 320 and 321 on the head 216. To aid in the outward displacement of the first and second clamp members, springs 322 and 323 bias the linkages 218 and 220 respectively. The continued outward movement of the laterally extending legs 225 and 227 results in the release of the clamp projections as described hereinabove. Since the time necessary to return the cartridge 40 to the storage magazine once the transfer carriage reaches its rest position can be easily calculated, the second transfer mechanism drive motor energization circuit 303 will be broken by a time delay switch at the end of the time interval. The first arm 204 will thereafter come to rest on the second arm 207 and the first and second clamp members 222 and 223 will then be in a position to receive the next cartridge which is positioned at the transfer point.

THE FILM REPRODUCTION UNIT

Figure 16:
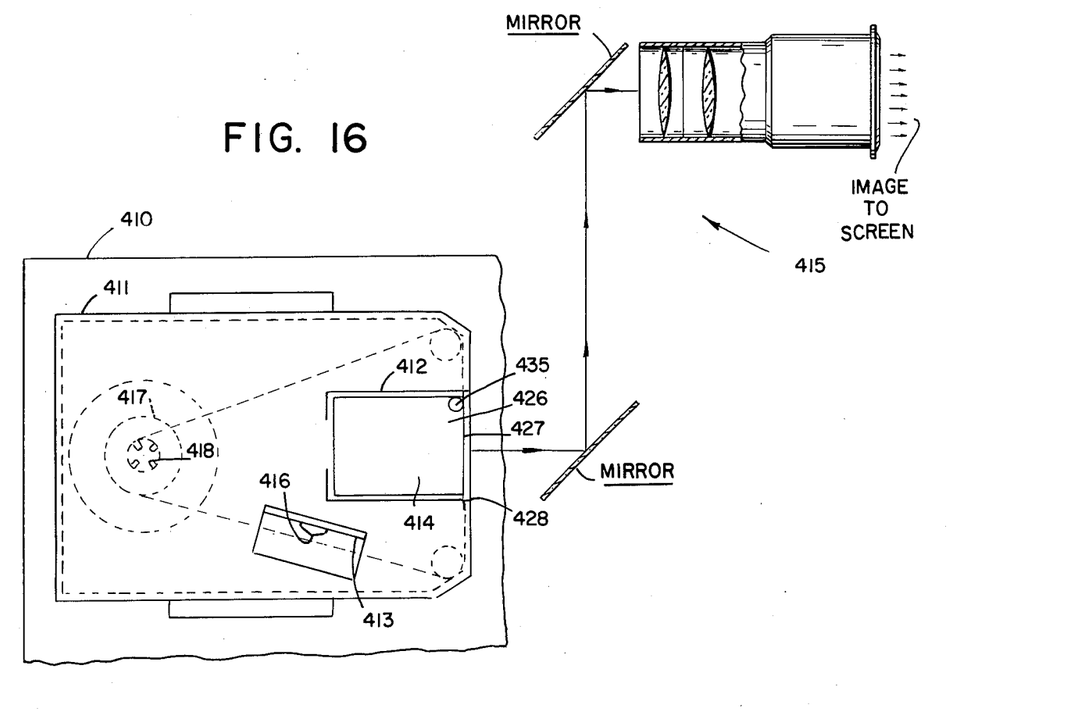
FIG. 16 is an enlarged partial sectional view taken substantially along the lines 16—16 of FIG. 10.
Figure 17:
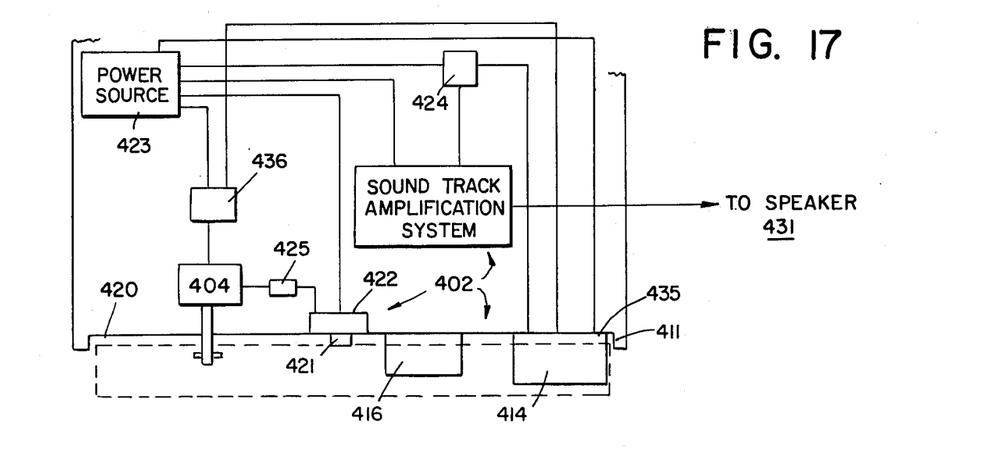
FIG. 17 is a schematic diagram of the film reproduction unit in accordance with the present invention showing in dotted line a cartridge positioned therein.

As mentioned hereinabove, the cartridge containing the selected film program is removed from the storage magazine 26 by the transfer mechanism 28 and is positioned within the film reproduction unit 30. With reference to FIGS. 10, 16 and 17, the film reproduction unit 30 includes a projection system 400, a sound track pickput and amplification system 402 and a film drive system 404.

The components of the reproduction system are well known to those skilled in the art and will not be described in detail herein.

The film reproduction unit 30 is provided with a face 410 which has a recessed area 411 therein dimensioned slightly greater than the cartridge 40 so that the cartridge 40 may be set into the face 410. Positioned within the recessed area 411 are sets of ribs 412 and 413 which, as will hereinbelow be described in detail serve to aid in the positioning of the cartridge 40.

The projection system 400 includes an illumination unit 414 within the recessed area 411 adapted to direct light through the film when the cartridge 40 is positioned in the reproduction unit. The projection system also include the necessary optic unit identified generally as 415 to direct, magnify and focus the image produced when the film is illuminated. The image produced may be directed to a screen (not shown) so that it may be visible to a group of individuals.

The sound track pickup and amplification system 402 includes an audio pickup head 416 which will receive the audio signals imposed on the film as the film moves across it.

The film drive system 404 includes a drive spindle 417 which is provided with tabs 418 thereon adapted to be received within the drive spindle aperture 74 in the turntable 60 when the cartridge is positioned in the film reproduction unit 30.

Projecting from the back surface 420 of the recess 411 is a tab 421 which will abut the cartridge 40 as it is positioned in the recess area 411. The tab 421 is part of a push-button switch 422 which will be closed as the cartridge 40 is positioned in the recess 411.

The positioning of the cartridge 40 within the film reproduction unit 30 can be best seen in FIG. 17, where the cartridge 40 is represented in phantom lines.

As the cartridge 40 is moved into the recessed area 411 by the transfer mechanism 28, the illumination unit 414 and the audio pickup head 416 are received within apertures 93 and 94 respectively in the cartridge. The sets of ribs 412 and 413 bear against the walls 95 and 96 of the apertures 93 and 94 respectively to aid in the positioning of the cartridge in the recessed area 411.

The closing of the push-button 422 will cause the power source 423 to energize the film drive system 404 in the reproduction as shown. The projection system 400 and the sound track pickup and amplification systems 402 are energized by the power source 423 when a master switch 424 is closed. Optionally, these systems may be engaged by the closing of switch 422. A time delay switch 425 will delay activation of the film drive system 404 to insure that the cartridge is positioned completely in the recessed area 411. The energization of the film drive system 404 will result in the film 62 traveling within the cartridge as hereinabove described and passing between the outlet 426 on the illumination unit 414 and the optic unit 415. The cartridge 40 is provided with an opening 427 in its end wall 428 to permit the illumination of the transparencies in the film. As the film 62 moves through the cartridge 40, it will pass over the audio signal pickup head 416 which will pick up the sound track 430 on the film. The sound track will be amplified by the system 402 and dispersed through speakers 431 conveniently located.

Figure 18:
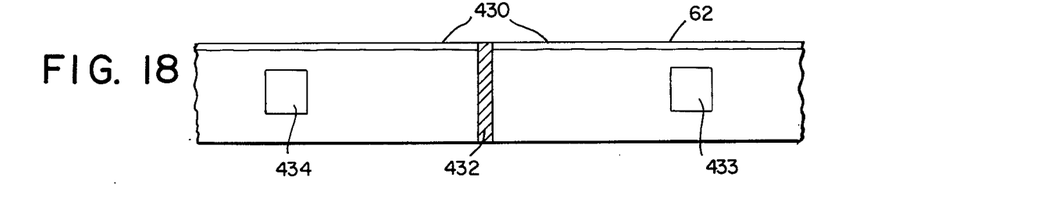
FIG. 18 is an enlarged view of a portion of a film contained within the cartridge.

Since the film 62 is an endless loop as mentioned hereinabove, the film program would be repeated continuously unless a means were provided for stopping the operation of the reproduction unit. A curing means 432 (FIG. 18) is positioned on the film 62 between the last frame 433 of the film program and the first frame 434 of the first program. The cuing means 432 may be a metallic strip. This type cuing means is well known in the art and means on the film other than a metallic strip may be used without detracting from the present invention.

The cuing means 432 is spaced from the last frame 433 so that the film program will be completed as the means 432 passes over the cuing sensor 435 positioned within the recessed area 411. As the cuing strip passes over the cuing sensor 435, a signal will be directed to an interruption circuit 436 which will de-energize the film drive system 404 stopping the film. The inertia generated in the film drive system will carry the cuing means beyond the cuing sensor 435 so that when the cartridge 40 is later placed in the film reproduction unit 30, the film program can be played in its entirety before the cuing means 432 again contacts the cuing sensor 435.

In addition to the cuing means 432 causing the stoppage of the film drive system 404, it also causes the interruption of the solenoid energization circuit 297 resulting in the transfer carriage 202 returning to the rest position on the base 203 under the influence of the coil springs 302 as described hereinabove. Further, the cuing means 432 activates a time delay switch 440 in a second transfer mechanism drive motor energization circuit 299 as discussed hereinabove so that the transfer mechanism 26 can return the cartridge 40 to its position on the storage magazine 24.

When the transfer mechanism 28 has returned the cartridge 40 to the storage magazine 26, the projection system is in condition to respond to an output signal from the selector system 26 to reproduce the next selected film program.

It can be seen from the foregoing detailed description that the object of the present invention namely, to create a film projection system has been achieved by providing a collection of cartridges, each containing a film program in the form of an endless loop therein. The film program is stored on a turntable within the cartridge and its path through the cartridge is controlled by guide rollers and pressure pads.

Each of the cartridges is detachably supported in a storage magazine which is in the form of an endless loop created by hingedly-connected elements. The storage magazine is supported between a pair of pulleys.

A selector system is provided with a series of actuatable selecting buttons each of which have a switch associated therewith. Each film program stored in the storage magazine may be identified by a code and when a particular code corresponding to the desired film program is put into the selector system by actuating the corresponding selecting buttons, an input signal is conveyed to a memory and comparator. The memory and comparator compares the input signal with the input signal last received and generates an output signal which is conveyed to a magazine drive motor which is in operable communication with one of the pair of pulleys. The output signal energizes the magazine drive motor to cause displacement of the storage magazine so that the cartridge containing the selected film program is positioned at a transfer point.

A transfer mechanism which is adjacent the cartridge when the cartridge is positioned at the transfer point includes a set of telescoping arms which are supported on a carriage that is slidably mounted on a base. A transfer mechanism drive motor is energized by the selector system to displace a first arm having clamp members thereon so that the clamp members will engage the cartridge. After the clamp members engage the cartridge, the continued energization of the transfer mechanism drive motor results in the first and second arms being displaced on the carriage until the transfer mechanism drive motor is de-energized. Simultaneous to the de-energization of the transfer mechanism drive motor, a solenoid having a shaft attached to the carriage is energized placing the cartridge within a film reproduction unit.

The film reproduction unit is adapted to receive the cartridge therein and is provided with a projection system, a soundtrack pickup and amplification system, and a film drive system. When the cartridge is positioned in the film reproduction unit, the film within the cartridge is brought into operable communication with the projection and soundtrack pickup and amplification systems. In addition, the film drive system operatively engages the turntable within the cartridge, is energized, and displaces the film within the cartridge resulting in the film program being reproduced.

A cuing means on the film program causes the de-energization of the film drive motor upon completion of the film program and also causes de-energization of the solenoid to withdraw the cartridge from the film reproduction unit. The cuing means in addition causes a delayed energization of the transfer mechanism drive motor to return the cartridge to the storage magazine.

The projection system is now in a condition to reproduce the next selected film program.

While in accordance with the patent statutes a preferred embodiment of the present invention has been illustrated and described in detail, it is to be particularly understood that the invention is not limited thereto or thereby.

Having thus described the invention, there is claimed as new and desired to be secured by Letters Patent:

1. A sound film projections system comprising a displaceable film storage magazine, means for displacing said storage magazine, a plurality of discrete sound film cartridges mounted in said magazine, each of said cartridges containing a sound film program containing visual images and a sound track, a film projection adapted to receive one of said plurality of cartridges from said film storage magazine and to reproduce said sound film program contained in said one cartridge, a selector system, a transfer means adapted to remove said one cartridge from said storage means and position it within said film projector, said selector system including actuating means to manually actuate said storage magazine displacement means so that said one cartridge selected is positioned adjacent said transfer means, said transfer means being actuated to transfer said one cartridge from said film storage magazine to said film projection, means associated with said film projector adapted to activate said film projector upon the positioning of said cartridge therein to reproduce said sound film program contained in said one cartridge, and cuing means adapted to deactivate said film projector upon completion of said program and adapted to activate said transfer means to return said one cartridge to said film storage magazine upon completion of said sound film program, said transfer means including at least a first arm and a second arm, said arms being in telescoping orientation, a carriage for supporting said arms, said carriage being slidably mounted on a base, clamp members on said first arm adapted to engage said one cartridge, a transfer mechanism drive motor, means in said selector system to energize said transfer mechanism drive motor when said actuating means is manually actuated, so that said first arm is displaced and said clamp members engage the one cartridge, said transfer mechanism drive motor thereafter displacing said first and second arms on said carriage until said transfer mechanism drive motor is de-energized, a solenoid, said solenoid having a shaft connected to said carriage, and means in said selector system to energize said solenoid concomitantly with the de-energization of said transfer mechanism drive motor so that said one cartridge is place within said film projector.

2. The sound film projection system of claim 1 in which each cartridge is provided with an inner turntable, and said sound film program in each cartridge is in the form of an endless loop stored on said turntable.

3. The sound film projection system of claim 2 in which a plurality of guide rollers and a plurality of pressure pads are provided within said cartridge so that the path of the sound film through the cartridge is controlled.

4. The sound film projection system of claim 1 in which the film storage magazine is an endless loop formed by a plurality of hingedly-connected elements, said endless loop being supported by a pair of opposed pulleys.

5. The sound film projection system of claim 1 in which said manually actuating means is a plurality of manually actuatable buttons, each of said cartridges being identified by a code, one of said buttons corresponding to a part of said code, and a plurality of electrical switches which when closed complete an electric circuit causing a predetermined signal to be generated, each of said buttons being connected to one of said switches so that depression of at least one of said buttons generates a predetermined electrical signal to said storage magazine displacement means, and said storage magazine displacement means includes a drive motor adapted to displace said storage magazine a predetermined amount in response to a specific signal so that a cartridge identified by the code corresponding to the button depressed is positioned adjacent said transfer means.

6. The sound film projection system of claim 5 in which the selector means further includes a memory and a comparator, so that said electrical signal generated by depressing at least one of said buttons is compared with a previous signal and an output signal is generated which activates said drive motor.

7. The sound film projection system of claim 1 in which said film projector includes means to emanate light so that said visual images are projected from said film in said one cartridge, a soundtrack pickup and amplification system so that said soundtrack may be reproduced, and a film drive system, said film drive system extending to means to displace said sound film within said one cartridge, so that when said one cartridge is positioned in said film projector, said film within said one cartridge is brought into operable communication with said means to emanate light and said soundtrack pickup and amplification system, and said sound film program is thereby reproduced.

8. The sound film projection system of claim 7 in which said cuing means is positioned on said sound film.

* * * * *